United States Patent
Lingl, Jr.

[11] 4,029,198
[45] June 14, 1977

[54] METHOD AND APPARATUS FOR FORMING GROUPS OF BRICKS

[75] Inventor: Hans Lingl, Jr., Paris, Tenn.

[73] Assignee: Lingl Corporation, Paris, Tenn.

[22] Filed: July 5, 1973

[21] Appl. No.: 376,302

[52] U.S. Cl. .............................. 198/425; 198/460
[51] Int. Cl.² ....................................... B65G 47/26
[58] Field of Search ................. 198/21, 34, 37, 40, 198/425, 459, 460, 461; 214/8.5 R, 8.5 A, 8.5 SS

[56] References Cited

UNITED STATES PATENTS

| | | | |
|---|---|---|---|
| 3,075,630 | 1/1963 | Fisk | 198/37 |
| 3,127,029 | 3/1964 | Luginbuhl | 214/8.5 R |
| 3,217,859 | 11/1965 | Bartlo et al. | 198/34 |
| 3,486,602 | 12/1969 | Zuercher | 198/34 |
| 3,731,787 | 5/1973 | Gregor | 198/37 |

Primary Examiner—Evon C. Blunk
Assistant Examiner—Joseph E. Valenza
Attorney, Agent, or Firm—Cushman, Darby & Cushman

[57] ABSTRACT

A series of moving articles (brick or slug-sized) is supplied to an accumulating apparatus adapted to engage the articles so as to slow their further movement thereby causing them to accumulate in a closed up formation. A sensor detects the accumulation of a predetermined length comprising at least one such article on the accumulating apparatus whereupon a control signal is generated causing a clamping or transfer control means to temporarily prevent further supply of the articles onto the accumulating apparatus and a further conveyor is caused to cooperate with the accumulating apparatus to transport the thus separated predetermined lengths of articles onto a push-off station. Here, the predetermined length is pushed onto other apparatus for accumulating the predetermined lengths into flats of bricks, facing those bricks into double layered flats, grouping the double layered flats, gripping and stacking them such as, for instance, in hacking freshly cut bricks for firing in a kiln. If the articles are slug-sized rather than already cut bricks, a side cutting station is disposed opposite the pusher station so that the slug sized blocks are automatically cut into brick sized articles as they are pushed off the pushing station into the accumulating, facing, layering, grouping, gripping and stacking apparatus.

25 Claims, 5 Drawing Figures

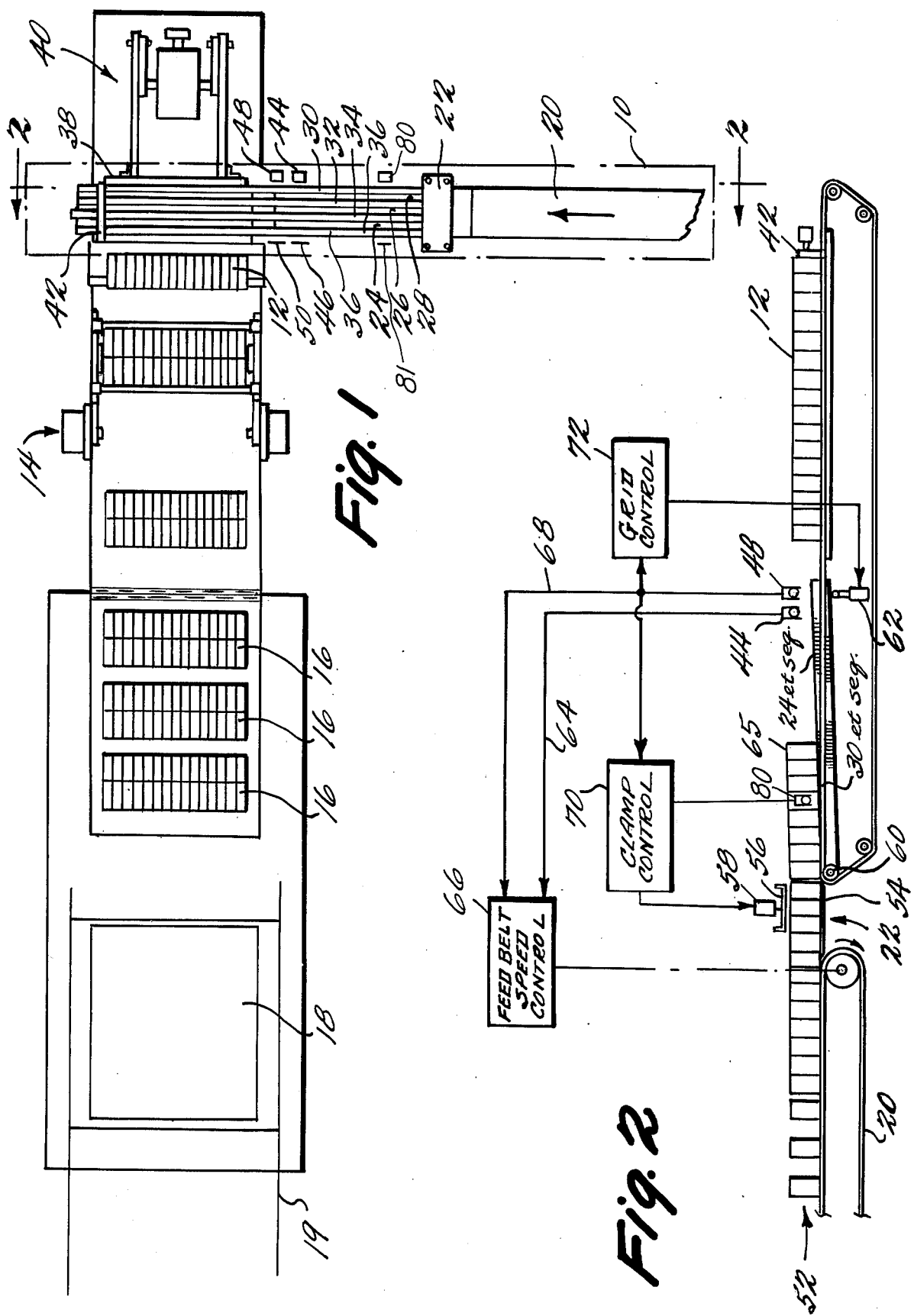

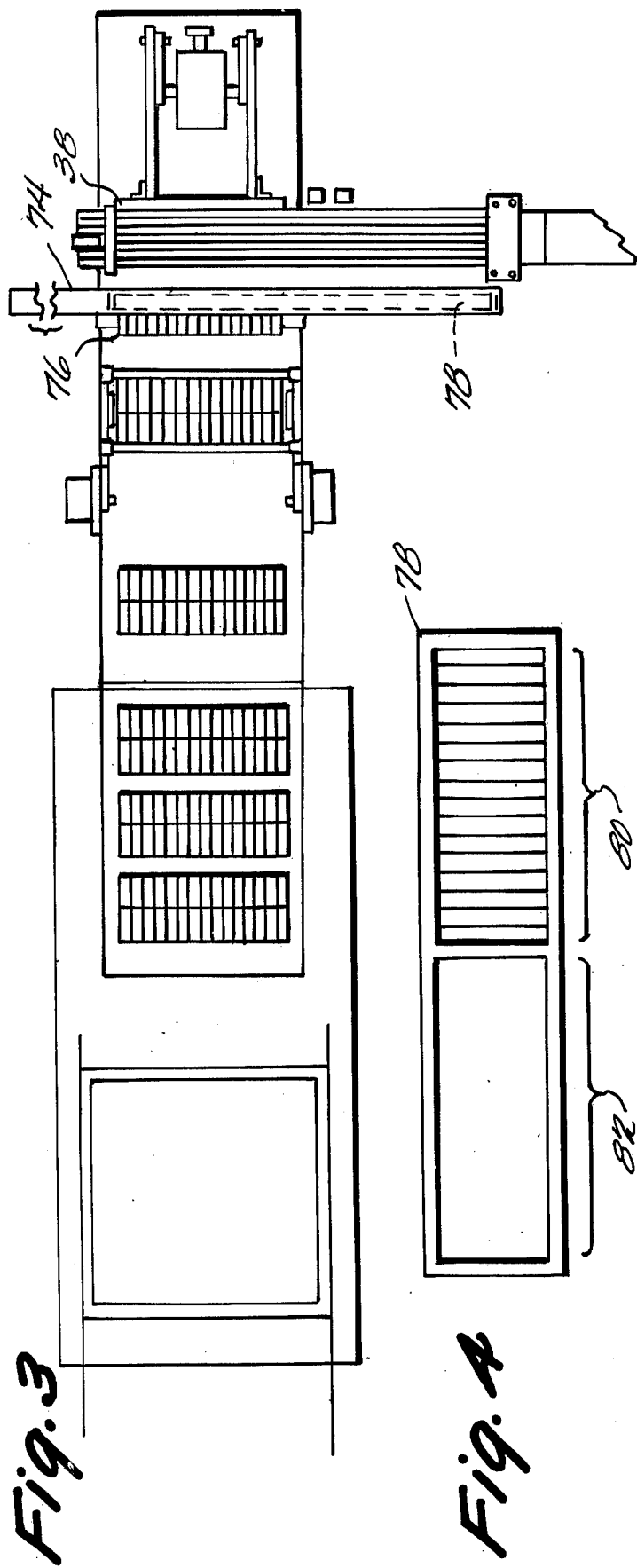

METHOD AND APPARATUS FOR FORMING GROUPS OF BRICKS

This invention generally relates to method and apparatus for separating and/or processing predetermined numbers of block-like articles in a brick making process. In a first mode of operation the invention processes already cut bricks by accurately and rapidly measuring out predetermined lengths of such cut bricks into other apparatus for facing the bricks and forming double layered flats, gripping such flats and stacking them in a hack. In another mode of operation, the same apparatus is utilized for processing slug-sized blocks that have already been cut into similar predetermined lengths, for separating the slug-sized blocks and ordering their passage through a cutting station whereby they are automatically cut into brick sized articles for forming into double layered flats of faced bricks for gripping and stacking in a hack.

Some prior art systems have been utilized for processing predetermined numbers of already cut bricks (See U.S. Pat. Nos.: 3,480,161 — Bason and 3,388,815 — Lingl) and for processing slug-sized articles (See U.S. Pat. No. 3,468,988 — Lingl). However, the method and apparatus as described herein represents a considerable improvement in speed and accuracy for handling already cut bricks and, at the same time, is also usable for handling slug-sized articles as well as brick sized articles thus representing a considerable improvement in flexibility and lower capital investment, etc., since the same method/apparatus can be utilized for different brick production runs utilizing different cutting techniques, etc.

Prior grouping devices for feeding already cut bricks and grouping same into predetermined lengths actually become quite inaccurate in their operation at high speed for varying reasons. At least some of the difficulties with high speed operation of such prior art devices are believed to be caused by the fact that such operations usually involve the accumulation of bricks on a feed belt against a stop thus causing continuous and increasing friction to occur with respect to the feed belt which, in turn, results in a changing column speed with changing pressure against the stop. Furthermore, resulting column stiffness in such an operation frequently causes problems in such machines by feeding an extra brick to a subsequent pusher station which then tends to wedge the extra brick into the system. The prior art systems also tend to be somewhat inaccurate in positioning the bricks on the grouping tables and often require aligning pushers after facing operations to achieve a required setting accuracy for automatic gripping and stacking operations. Heavy distributing gripper systems and/or long reaction times for gripping and/or clamping systems often cause difficulties in such prior art systems when it is attempted to pick up an accurate number of bricks every time at a high volume operation.

However, with the invention as described below, it is possible to accumulate groups of articles such as bricks in a predetermined number which can be varied, and at extremely high speeds, for feeding into the push-off station of a setting machine such as that which is described in U.S. Pat. No. 3,468,988 — Lingl. In addition, besides permitting such a setting machine to receive bricks that have already been cut (e.g. with a reel cutter) the very same apparatus will also provide the setting machine with slugs which may be cut into brick sized articles by using a side cutter in cooperation with the pusher as the slugs are pushed off the push-off station into the setting machine.

In the exemplary embodiment described in more detail below, the already cut bricks are accumulated by pushing them onto a grid of vertically movable parallel ledges which are interspersed between and (in the engaged position) slightly above a number of individual conveyor belts or chains or the like, the frictional forces generated between the bricks and the grid causing the bricks to accumulate thereon until the correct number of bricks have been accumulated corresponding to some predetermined length. When this predetermined length is detected by a suitable sensor situated at a predetermined distance (substantially equal to the predetermined length) from the beginning of the grid, a control signal is generated which lowers the grid between the individual conveyor belts which belts (or other transport means) will then engage the accumulated group of bricks and transport them to a stop at a push-off position where the group may be pushed off onto a receiving table where conventional operations are used to form flats, to face individual flats into doublelayered flats of faced bricks, to group, to grip and to stack the double layered flats.

Since the brick groups are fed to and accumulated upon a stationary slide rail or ledge utilizing only frictional forces on that ledge, the speed at which the bricks arrive or the column stiffness cannot lead to undesired compression of the group of bricks or individual bricks and/or to miscounting as in prior art arrangements.

Furthermore, the placement of the grouping device ahead of the push-off point for the setting machine permits the feeding of slug-sized blocks of a length equivalent to the desired length of the group of cut bricks without any changes in the apparatus involved. This slug-sized block of material is then cut into brick-sized articles when it is pushed from the push-off position through a side cutter in a manner similar to that described in U.S. Pat. No. 3,468,988.

There are several reasons why brick makers may find a need to include a capability for both grouping already cut bricks and for separating slug-sized blocks of material for cutting with a side cutter. For instance, some special products like paper cut bricks may be cut using existing cutting machinery such as a reel cutter while other more high volume products may be cut in a side cutting operation.

Accordingly, a brick maker using the invention described herein may utilize a common apparatus for handling either the slug-sized articles in combination with a sidecutter or for grouping and assembling already cut brick sized articles into groups of predetermined lengths and pushing them off into other apparatus for forming double layered faced flats of bricks and for gripping and stacking same. Thus, for the first time, this invention provides such a capability for accurate high speed production and permits the brick maker to improve his system in steps by changing from one to the other kind of cutting system as his production requirements dictate.

To facilitate changing the mode of operation involved in the invention, the side cutting apparatus is preferably built as a shiftable frame having cutting wires located in one half with guide plates for the outside bricks, etc., and having another half which is entirely vacant, i.e., no cutting wires. Then by simply shifting the frame from one aperture to the other, the apparatus may be converted from a machine for handling already cut bricks (with the empty aperture opposite the push-off station) to a machine for handling slug-sized blocks in combination with the sidecutter (when the aperture with cutting wires is located opposite the push-off station).

These and other advantages and objects of the invention will become more clearly apparent from the following detailed description taken in conjunction with the accompanying drawings, in which:

FIG. 1 is a plan view of exemplary apparatus for practicing this invention;

FIG. 2 is a cross sectional side view of the grouping apparatus shown in FIG. 1 for practicing this invention;

FIG. 3 is a plan view of apparatus for practicing this invention which includes an exemplary apparatus for selectively altering the mode of operation for handling either brick sized articles or slug-sized articles;

FIG. 4 is a front view of an exemplary embodiment for the selective control apparatus shown in FIG. 3; and FIG. 5 is a set of timing diagrams for the exemplary embodiment shown in FIG. 1 and useful in explaining the sequence of operations performed in the exemplary embodiment.

As shown in FIG. 1, the invention includes a grouping means 10 which produces a row of bricks 12 having a predetermined length (i.e., a predetermined number of bricks) which are input to a grouping and facing mechanism 14 comprising conventional conveyors and turnover devices for forming faced double layered flats of bricks 16 which are arranged (by conventional means) for automatic gripping by a gripper 18 which may travel along conventional rail mechanisms 19, etc., to deposit the gripped bricks in a hack such as for firing in a kiln as will be appreciated by those in the art. The grouping and facing mechanism 14 and devices for forming the double layered flats, gripping and stacking the same in a hack, etc., are, per se, known in the art as shown for example in U.S. Pat. No. 3,468,988 — Lingl. For instance, the spacing of the brick rows 12 and/or of the flats 16, etc., may be accomplished by sequenced or program control of a plurality of conveyor belts as, for instance, shown in U.S. Pat. No. 3,625,375 — Lingl.

As will be described in more detail below, the grouping apparatus 10 may be utilized to process either already cut bricks or slug-sized blocks having a length corresponding to the predetermined length of cut bricks such as that of the row 12 shown in FIG. 1.

The exemplary embodiment for the grouping device 10 shown in FIG. 1 includes a conveyor or feed belt 20 for feeding the bricks or slugs through a selectively actuatable clamping device 22 onto grid of parallel ledges or bars 24, 26 and 28 which are interspersed between and slightly raised above conveyor belts 30, 32, 34 and 36. The grid comprising bars 24, et seq., are relatively movable in the vertical direction with respect to the interspersed conveyor belts 30 et seq.

The downstream end of the conveyor belts 30 et seq. comprise a push off staton disposed opposite a pusher bar 38 which is selectively actuatable by a drive mechanism 40 to transversely push a row of bricks (that have been conveyed against the stop 42) from the conveyor belts 30 et seq. into the position shown for the row 12 on a receiving table or conveyor belt whereby the row is fed into the conventional mechanism for forming faced double layered flats of bricks and for gripping and stacking same as previously described.

When the grouping apparatus 10 is utilized with already cut bricks, a series of such already cut bricks is supplied on feed belt 20. Since the clamp plate 22 is normally released, the cut bricks may normally pass freely through the clamping station 22 and ride up onto the normally raised rails 24, et seq. Since the raised rail keeps the bricks out of contact with the moving conveyor belts 30 et seq., the bricks are frictionally engaged only by the rails and this tends to slow their movement such that they accumulate thereon in a closed-up formation as should be apparent.

As the group of bricks thus being accumulated becomes sufficiently long, they will actuate a first photo electic sensor 44 (disposed opposite a light source 46) and generate a control signal which is utilized for temporarily slowing the speed of the feed belt 20. Thereafter, the bricks will continue to accumulate (but at a somewhat slower speed) until they nearly reach the end of the rails 24, et seq., whereupon the second photo electric sensor 48 is actuated (disposed opposite source 50).

Since the second sensor 48 is located at the desired predetermined length of distance from the receiving end of the rails 24 et seq. (or from the end of the clamping means 22), this is a signal that the predetermined length of cut bricks has been accumulated successfully upon the rails and the control signal generated by sensor 48, accordingly, accomplishes several functions.

First of all, the clamp means 22 is actuated so as to prevent further accumulation of bricks and, simultaneously, the rails 24 et seq. are moved relative to the conveyor belts such that the rails are disengaged from frictional contact with the bricks while the moving conveyor belts 30 et seq. are engaged with the brick group that has been thusly accumulated so that the brick group is moved toward the stop 42 and the push-off station opposite the pusher bar 38 conventional means such as a switch operating in conjunction with stop 42 may be utilized for controlling the pusher bar 38 as will be apparent.

As soon as the accumulated group of bricks has been moved a predetermined distance (which may correspond to a predetermined time delay) from the clamping means 22, the clamp means 22 is released to permit more bricks to begin to move out behind the moving group of accumulated bricks. As soon as the group of accumulated bricks has completely passed by detector 48, the rails 24 et seq. are again raised relative to the interspersed conveyor belts thus frictionally engaging the new group of bricks emerging from the clamping means 22 and causing this new group of bricks to accumulate in a manner similar to that previously described. As can now be appreciated, the operation of this mahcine will automatically result in predetermined lengths of bricks such as row 12 being cyclically accumulated and pushed out of the pusher station into the receiving area of apparatus which subsequently forms the rows of bricks into faced double layered flats, grips and stacks them in a hack, etc.

This operation that has just been described with respect to already cut bricks may, perhaps, be better understood by reference to FIGS. 2 and 5. Here, a row of randomly spaced already cut bricks 52 is shown advancing to the right on a moving conveyor belt 20. The bricks advance through a clamping station 22 which may comprise a stationary bottom transition plate 54 in combination with a vertically movable clamp plate 56 which may be controlled, for example, by a solenoid 58. Normally, the solenoid 58 and top clamp plate 56 are raised to permit the bricks 52 to pass freely therethrough.

As shown in FIG. 2, the rails 24 et seq. are normally raised relative to the interspersed conveyor belts 30, etc. This may be accomplished, for instance, by hinging the rails at 60 and connecting the other end of the rails to a vertically actuatable solenoid 62. Other techniques for raising or moving the rails relative to the interspersed conveyor belts will be appreciated by those in the art.

Normally, as shown at the left side in FIG. 5, the sensors 44 and 48 are both open (unactuated) and the feed belt 20 is traveling at its normal high speed while the clamp is open and the grid of rails is in its "up" position. Then, when the first brick of an accumulated group forming on the rails between the end of the clamp 22 and the position of the sensors along the rails actuates the first sensor 44, the output from the sensor 44 is fed via conductor 64 to a conventional feed belt speed control mechanism 66 for temporarily slowing the speed of the feed belt 20 thereby decreasing unnecessary load on the drive motor and unnecessary friction between the moving belt surfaces and the temporarily stopped bricks, etc., as will be apparent. Subsequently, the bricks will continue to accumulate (albeit at a somewhat slower rate) until the leading brick 65 continues to move past the first sensor 44 and finally actuates the second sensor 48 thus generating another control signal on conductor 68 which may be utilized for several functions.

In the exemplary embodiment, the feed belt speed control 66 is released by this second control signal on line 68 to again increase feed belt speed to its normal fast value. Of course, a simple time delay from the first control signal might also be utilized if desired and other modifications of the exemplary embodiment will be apparent to those in the art from this description.

The second sensor 48 is located at a predetermined distance along the rails from the clamp 22 such that a precisely predetermined number of bricks are accumulated between these two points before the sensor 48 is actuated. Accordingly, when the sensor 48 is actuated, the control signal on line 68 is simultaneously utilized by the clamp control 70 to actuate the solenoid 58 and clamp the bricks therein thus temporarily preventing further transfer of bricks through the clamping means and onto the rails.

At substantially the same time, the control signal on line 68 is utilized by a grid control means 72 for actuating the solenoid 62 and lowering the rails with respect to the interspersed conveyor belts thus permitting the interspersed conveyor belts to engage the brick group that has been accumulated on the rails and move it to the right in line with the pusher station whereat the accumulated row may be pushed off as row 12 and further processed as previously described.

The clamp operation may be controlled by a time delay to automatically release again after a predetermined distance has been placed between the moving accumulated group of bricks and the clamp. Alternatively, appropriate means such as a photo electric sensor 80 (cooperating with light source 81) or the like might itself be incorporated to actually detect the physical separation between the moving group of already accumulated bricks and the temporarily clamped bricks. In any event, the clamp will open up after a suitable time period to permit further bricks to pass therethrough and over the rails. As soon as the already accumulated group of bricks has passed over the end of the rails, as detected by sensor 48, the grid control 72 again deactuates the solenoid 62 to place the grid in its upward position for frictionally engaging the bricks and preventing their contact with the conveyors 30 et seq. Accordingly, a new group of bricks will now be formed on the rails 24 et seq., as previously described thus defining a continuous cyclic operation whereby the bricks 52 are rapidly and precisely formed into predetermined lengths and transported into a push-off station where they are pushed off as rows 12 for processing as previously described.

Most remarkably, the apparatus and method just described with respect to FIGS. 2 and 3 will also work for slug-sized blocks of clay which have not yet been cut into brick-sized articles but which have been cut into lengths substantially corresponding to the predetermined length of the row of cut bricks 12. In this operation, a series of the slug-sized blocks will be supplied by the conveyor belt 20 in a manner similar to the supply of bricks previously discussed. As will be appreciated, conventional mechanisms may be utilized for cutting the clay into the slug-sized blocks of desired predetermined lengths.

Visualizing the operation of the system with such slug-sized blocks, it will be appreciated that as soon as one slug-sized block passes completely through the clamping mechanism 22 and onto the rails 24 et seq., the sensors 44 and 48 will operate as previously described such that the clamp 22 will prevent any subsequent slug-sized block from progressing while the slug-sized block already on the rails 24 et seq. will be transferred to the interspersed conveyor belts 30 et seq. by actuation of solenoid 62 as previously described such that each slug-sized block will be successively separated from the previous one and transported to the push-off station opposite the pusher bar 38.

Accordingly, as shown in FIG. 3, the same apparatus may be utilized for handling slug-sized articles provided that a cutter station 74 is disposed between the pusher 38 and the receiving table or other apparatus 14, etc. Thus, as each slug-sized block is pushed by pusher 38 through the cutting station 74 (which may include parallel cutting wires, etc., as disclosed, for instance, in U.S. Pat. No. 3,468,988 — Lingl) the slug-sized block will be cut into brick-sized articles 76 as shown in FIG. 3.

In the preferred exemplary embodiment, the cutting station 74 comprises a slidable apparatus 78 shown in more detail at FIG. 4 as comprising two apertures therein. A first of the apertures 80 contains conventional wire cutters spaced at brick-sized intervals whereby the slug-sized blocks may be automatically cut into brick-sized articles as they are pushed therethrough. The other aperture 82 is preferably an open aperture such that it effectively defines an inoperative position for the slidable apparatus 78. In this inoperative position, the already cut bricks that have been accumulated in groups may be pushed through the open aperture by the pusher 38 without any interference in an operation as previously described with respect to FIGS. 1 and 2. Of course, once the slug-sized blocks have been separated from one another, fed to the pusher station and pushed through the cutter station 74 when in its operative position (when the slidable mechanism 78 has positioned the aperture 80 opposite the pusher 38) then, the resulting row of bricks will always have the correct predetermined length and will be processed by subsequent mechanisms 14, etc., as previously described.

While the foregoing description has been with reference to the preferred exemplary embodiment, those in the art will readily recognize that many modifications and adaptations may be made in the exemplary embodiment without in any way departing from the broader aspects of the invention. For instance, the rails 24 etc., and interspersed belts 30 etc., may obviously be moved with respect to one another to selectively engage and disengage from the bricks or slug-sized blocks in many different manners. The clamp 22 may take many different forms such as a control of the speed of feed belt 20 rather than a physical clamping operation, etc. These and other modifications of the system described herein will be obvious to those in the art once they have read and understood the foregoing description of the exemplary embodiment and all such modifications are thus intended to be included within the scope of this invention.

What is claimed is:

1. Apparatus for rapidly and accurately grouping block-like articles into predetermined lengths having at least one such article in each length, said apparatus comprising:
    first transport means for supplying a moving series of said articles,
    accumulating means disposed to receive said articles from said first transport means and for frictionally engaging such articles so as to slow but not stop their further motion thereon and to cause them to accumulate thereon in closed-up formation,
    sensor means for detecting when said predetermined length of at least one article has been accumulated on said accumulating means and for producing a control signal in response thereto,
    second transport means disposed to cooperate with said accumulating means for transporting said predetermined length therefrom, and
    second transfer control means, for effectively disengaging said accumulating means from said predetermined length and for engaging said second transport means therewith in response to said control signal.

2. Apparatus as in claim 1 wherein said first transport means comprises a conveyor belt.

3. Apparatus as in claim 1 wherein said accumulating means comprises:
    a plurality of parallel elongated members disposed to frictionally receive said articles thereover.

4. Apparatus as in claim 3 wherein said second transfer control means includes means for raising said members into frictional engagement with said articles and for lowering said members out of frictional engagement with said articles.

5. Apparatus as in claim 3 wherein said second transport means comprises a plurality of conveyor belts interposed between said parallel elongated members.

6. Apparatus as in claim 5 further comprising means for mounting said parallel elongated members and said conveyor belts for movement relative to one another to effectively and selectively engage and disengage said accumulating means and said transport means by such relative movement.

7. Apparatus as in claim 1 wherein said sensor means is spaced from the receiving end of said accumulating means by a distance substantially equal to said predetermined length.

8. Apparatus as in claim 1 further comprising:
    first transfer control means disposed between said first transport means and said accumulating means and operatively connected to said sensor means for temporarily preventing further transfer of said articles onto said accumulating means in response to said control signal.

9. Apparatus as in claim 8 further comprising means for temporarily slowing the movement speed of said first transport means during at least part of the time said first transfer control means is rendered operative.

10. Apparatus as in claim 8 wherein said first transfer control means comprises a controllable clamping mechanism for physically clamping articles situated therein against further movement when actuated.

11. Apparatus as in claim 10, wherein the controllable clamp mechanism comprises a bottom transition plate and a vertically movable upper clamp plate.

12. Apparatus as in claim 10 wherein said first transfer control means includes time delay means for maintaining the clamping mechanism actuated for a predetermined time interval in response to said control signal.

13. Apparatus as in claim 10 wherein said first transfer control means includes means for detecting a predetermined space between the articles being prevented from further movement and the group of at least one article being separated therefrom by the second transport means and for releasing the articles then held therein in response to such detection.

14. Apparatus for rapidly and accurately grouping bricks into predetermined lengths, said apparatus comprising:
    first conveyor means for supplying a moving series of bricks generally in transverse alignment thereon,
    clamping means disposed at the supplying end of said first conveyor means for passing said bricks therethrough when in a first state and for preventing passage of said bricks therethrough when in a second state,
    interleaved second conveyor means and ledge means which are vertically movable with respect to each other and disposed at the discharge end of said clamping means for frictionally receiving said bricks therefrom and accumulating same onto the ledge means when it is vertically higher than the second conveyor means and for transporting an accumulated group of bricks away from said clamping means when the ledge means is vertically lower than the second conveyor means,
    detector means situated along said ledge means at a distance from said clamping means that is substantially equal to said predetermined length for producing a control signal when the bricks have sufficiently accumulated on said ledge means to form a group of bricks having said predetermined length, and
    control means responsive to said control signal for temporarily actuating said clamping means to its second state and for effecting coordinated temporary actuation of said second conveyor means and said ledge means so that said ledge means is vertically lower than said second conveyor means.

15. Apparatus as in claim 14 further comprising:

further detecting means situated along said ledge means upstream from said first-mentioned detector means for producing a further control signal in advance of said first-mentioned control signal, and further control means operatively connected to said first conveyor means and to said further detecting means for temporarily slowing the operation of the first conveyor means in response to said further control signal.

16. A method for rapidly and accurately grouping block-like articles into predetermined lengths having at least one such article in each length, said method comprising:

supplying a moving series of said articles from a first transport means, receiving said supplied articles from said first transport means and frictionally engaging such articles on a separate accumulating means so as to slow but not stop their further motion to cause them to accumulate thereon in closed-up formation, detecting when said predetermined length of at least one article has been accumulated on said accumulating means and producing a control signal in response thereto, providing second transport means disposed to cooperate with said accumulating means for transporting said predetermined length therefrom, and disengaging said accumulating means from said predetermined length and engaging said second transport means therewith in response to said control signal.

17. Method as in claim 16 wherein said receiving step comprises:

frictionally receiving said articles over a plurality of parallel elongated members.

18. Method as in claim 17 including the step of raising said members into frictional engagement with said articles during said receiving step and lowering said members out of frictional engagement with said articles during said disengaging step.

19. Method as in claim 16 further comprising:

temporarily preventing further transfer of said articles onto said accumulating means in response to said control signal.

20. Method as in claim 19 further comprising temporarily slowing the movement speed of said first transport means during at least part of the temporarily preventing step.

21. Method as in claim 14 wherein said temporarily preventing step comprises physically clamping articles situated in a controllable clamping mechanism against further movement when actuated.

22. Method as in claim 21 further comprising maintaining the clamping mechanism actuated for a predetermined time interval in response to said control signal.

23. Method as in claim 21 further comprising:

detecting a predetermined space between the articles being prevented from further movement and the group of at least one article being separated therefrom by the second transport means and releasing the articles then held therein in response to such detection.

24. Method for rapidly and accurately grouping bricks into predetermined lengths, said method comprising:

supplying a moving series of bricks generally in transverse alignment on a first conveyor means, passing said supplied bricks through a clamping means when in a first state and preventing passage of said bricks therethrough when the clamping means is in a second state, providing interleaved second conveyor means and ledge means which are vertically movable with respect to each other and disposed at the discharge end of said clamping means, frictionally receiving said bricks from the clamping means and accumulating such bricks onto the ledge means when it is vertically higher than the second conveyor means, producing a control signal when the bricks have sufficiently accumulated on said ledge means to form a group of bricks having said predetermined length, temporarily actuating said clamping means to its second state, and effecting coordinated temporary actuation of said second conveyor means and said ledge means so that said ledge means is caused to be vertically lower than said second conveyor means thereby transporting an accumulated group of bricks away from said clamping means.

25. Method as in claim 24 further comprising:

producing a further control signal in advance of said first-mentioned control signal, and temporarily slowing the operation of the first conveyor means in response to said further control signal.

* * * * *